United States Patent
Millier et al.

(10) Patent No.: US 8,740,568 B2
(45) Date of Patent: Jun. 3, 2014

(54) TURBOMACHINE FAN ROTOR

(75) Inventors: Xavier Louis Barthelemy Millier, Saint Mery (FR); Régis Eugène Henri Servant, Vigneux sur Seine (FR); Philippe Verseux, Draveil (FR)

(73) Assignee: SNECMA, Paris (FR)

( * ) Notice: Subject to any disclaimer, the term of this patent is extended or adjusted under 35 U.S.C. 154(b) by 610 days.

(21) Appl. No.: 12/995,063

(22) PCT Filed: Mar. 27, 2009

(86) PCT No.: PCT/FR2009/000347
§ 371 (c)(1),
(2), (4) Date: Feb. 22, 2011

(87) PCT Pub. No.: WO2009/144401
PCT Pub. Date: Dec. 3, 2009

(65) Prior Publication Data
US 2011/0150657 A1    Jun. 23, 2011

(30) Foreign Application Priority Data

May 29, 2008    (FR) ...................................... 08 02925

(51) Int. Cl.
*F01D 5/30*    (2006.01)
(52) U.S. Cl.
USPC ..................................................... 416/219 R
(58) Field of Classification Search
USPC .......... 416/221, 220 R, 220 A, 219 R, 219 A, 416/248, 204 A
See application file for complete search history.

(56) References Cited

U.S. PATENT DOCUMENTS

| | | | | |
|---|---|---|---|---|
| 2,753,149 | A * | 7/1956 | Kurti | 416/220 R |
| 3,689,177 | A * | 9/1972 | Klassen | 416/220 R |
| 5,540,552 | A * | 7/1996 | Surdi | 416/220 R |
| 5,727,927 | A |  3/1998 | Luxenburger | |
| 2001/0007633 | A1 | 7/2001 | Brioude et al. | |
| 2004/0126240 | A1 | 7/2004 | Bassot et al. | |

FOREIGN PATENT DOCUMENTS

| | | |
|---|---|---|
| EP | 1 114 916 | 7/2001 |
| EP | 1 400 698 | 3/2004 |
| FR | 2 733 791 | 11/1996 |
| FR | 2 841 933 | 1/2004 |

OTHER PUBLICATIONS

International Search Report Issued Sep. 15, 2009 in PCT/FR09/000347 filed Mar. 27, 2009.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A turbomachine fan rotor including a disk carrying blades with roots that are engaged in axial grooves of the disk, a spacer being interposed between the bottom of each groove and the corresponding blade root, the spacer including at its upstream end a nib for retaining the blade root, the nib including a downstream abutment face against which the upstream end of the blade root bears in event of a violent force being applied thereto, the abutment face being oblique relative to the axis of rotation of the rotor.

16 Claims, 2 Drawing Sheets

TURBOMACHINE FAN ROTOR

BACKGROUND OF THE INVENTION

1. Field of the Invention

The present application relates to a fan rotor for a turbomachine such as an airplane turboprop or turbojet.

2. Description of the Related Art

A turbomachine fan comprises a disk carrying blades at its outer periphery, the blades having roots that are engaged in substantially axial grooves in the outer periphery of the disk. The blades are held radially on the disk by co-operation between the shapes of their roots and the shapes of the grooves in the disk, the blade roots being of dove-tailed type, for example.

A spacer is interposed between the root of each blade and the bottom of the corresponding groove in the disk to prevent the blade from moving radially in the disk, and at its upstream end the spacer has a nib that extends radially outwards and that presents a downstream radial face forming an axial bearing surface for an upstream radial face of the blade root in order to retain the blade axially in the upstream direction. The spacers ensure that the blades on the disk all have the same axial position so as to avoid creating any unbalance, and they are suitable for bearing axially against an annular cheekplate fastened to the upstream end of the disk.

In the happily-infrequent event of a fan blade being lost or broken, the blade is projected against an adjacent blade, which is then subjected to an upstream axial force that is very violent, with this effect being transmitted to the upstream cheekplate by the corresponding spacer. The spacer comes to bear axially against the cheekplate which is designed to deform elastically in order to damp a portion of this axial force and thus avoid losing other blades of the fan. Axial retaining means for retaining the blades in an upstream direction are also mounted on the disk, downstream from the blades, in order to take up a portion of this axial force in the event of the deformation of the cheekplate reaching a certain threshold.

In the present art, the nib of each spacer is designed to transmit all of the above-mentioned axial force to the upstream cheekplate, and it is subjected to large shear forces in the axial direction while this force is being transmitted. It is therefore necessary for the nib to be overdimensioned in the axial direction so as to enable it to withstand the forces, thereby giving rise to each nib being large in axial size and to an increase in the total weight of the fan rotor.

In order to compensate for the overdimensioning in the axial direction of a spacer nib, it is possible to pare away the upstream end of the corresponding blade root to the same extent. Nevertheless, that solution is unsatisfactory since the blade root then presents an axial dimension that is shorter than the axial dimension of the groove in the disk and runs the risk of exerting high contact forces against the side walls of the groove that can lead to premature wear thereof.

BRIEF SUMMARY OF THE INVENTION

A particular object of the invention is to provide a solution to the above-mentioned problem of the prior art in a manner that is simple, effective, and inexpensive, by using axial retaining means for fan blades that are more effective, more compact, and lighter in weight than those of the prior art.

To this end, the invention provides a turbomachine fan rotor comprising a disk carrying blades having roots that are engaged in substantially axial grooves in the outer periphery of the disk, and spacers, each interposed between the bottom of a groove in the disk and the corresponding blade root, the upstream end of each spacer being designed to bear against a retaining cheekplate secured to the disk, and including a nib extending radially outwards and designed to retain the upstream end of the blade root, the rotor being characterized in that the nib of each spacer has a downstream abutment face against which the upstream end of the blade root bears in the event of a violent force, this downstream abutment face being oblique relative to the axis of rotation of the rotor.

In the event of a fan blade being lost or breaking, the blade adjacent to the lost or broken blade is thrust violently upstream and the upstream end of its root comes to bear against the nib of the spacer, which nib is moved upstream until it comes into abutment against the cheekplate. In order to continue to advance, the blade would need to mount onto the nib of the spacer by sliding over the oblique face thereof. Nevertheless, the blade already has its root bearing against the walls of the groove in the disk so it cannot move radially outwards. The oblique face of the nib of the spacer thus generates a wedging effect, thereby adding to the thrust that already exists between the blade root and the walls of the groove in the disk. This additional load enables a portion of the axial force exerted on the blade to be absorbed by friction between the blade root and the walls of the groove in the disk. The remainder of the axial force is transmitted by the spacer and the upstream cheekplate to the disk of the rotor.

The invention thus serves to reduce the shear forces that are applied to the nib of the spacer in the event of a fan blade being lost. This enables the axial dimension and thus the overall size of the nib of each spacer to be reduced, thereby enabling the spacers, and thus the fan rotor as a whole, to be lighter in weight. In one particular configuration, a weight saving lying in the range 600 grams (g) to 700 g has been observed on a complete fan module, i.e. a little less than 1% of the weight of the module.

As in the prior art, the spacer against which the above-mentioned axial force thrusts the blade subjected thereto comes to bear against the cheekplate, which deforms so as to damp this axial force. The fact of reducing the axial force exerted on the spacer and thus on the cheekplate enables the cheekplate to damp nearly all of this force, thus making it possible to envisage eliminating the axial retaining means for the blades that are mounted on the disk, downstream from the blades.

The downstream abutment face of the nib forms an angle lying in the range 10° to 80°, e.g. in the range 20° to 70° approximately, relative to the axis of the rotor. In a particular configuration, it has been found that the axial force transmitted to the nib of the spacer represents only 75% of the initial load when $\alpha$ is equal to 60°, and 50% of the initial load when $\alpha$ is equal to 45°.

According to another characteristic of the invention, the downstream abutment face of the nib is situated facing an upstream face of the blade root that also extends obliquely relative to the axis of rotation of the rotor and that is substantially parallel to the oblique downstream face of the nib. The oblique face of the blade root is designed to bear against the oblique face of the nib of the spacer.

In the unstressed state, the facing oblique faces of the nib and of the blade root are inclined relative to each other by an angle of less than 10°, e.g. lying in the range 2° to 5° approximately, this angle tending to disappear by elastic deformation of the nib in the event of a violent force being applied to the blade. In this state, the facing oblique faces of the nib and of the blade root are more preferably spaced apart from each other. In normal operation of the fan, the oblique faces of the blade root and of the spacer are thus separated by a small amount of clearance. In the event of a fan blade being lost or breaking, this clearance is designed to be taken up and the above-mentioned oblique faces are designed to come to bear one against the other. When the blade root bears against the nib of the spacer, the nib is designed to be deformed so that its oblique face becomes parallel to the corresponding oblique face of the blade root, which then bears against the entire surface area of the oblique face of the nib.

The nib includes at its radially outer end a downstream radial face for axially positioning the upstream end of the blade root, in the unstressed state. In normal operation, the blade root thus bears axially against the radially outer end of the nib, thereby keeping the oblique faces of the nib and of the blade root spaced apart from each other. In the event of a blade being lost, the blade root exerts axial thrust on the end of the nib, which deforms until the facing oblique faces of the nib and the blade root comes to bear one against the other.

The downstream axial face of the nib is preferably connected to the oblique face of the nib via a transverse groove that is designed to facilitate elastic deformation of the nib in the event of a blade breaking or being lost. The groove may have a section of concave rounded shape. The transverse groove may also form a zone of weakness of the nib that is designed to weaken the radially outer portion of the nib so that it can be separated from the remainder of the nib in the event of the axial force transmitted by the blade reaching a certain threshold.

The oblique face of the nib and/or the oblique face of the root may be smooth. In a variant, grooves or teeth may be formed on the oblique face of the nib and/or the oblique face of the blade root, which grooves or teeth serve to absorb additional energy by friction and by being flattened when the oblique faces come to bear one against the other.

The invention also provides a turbomachine, such as an airplane turboprop or turbojet, the turbomachine being characterized in that it includes a fan rotor as described above.

Finally, the invention provides a blade root spacer for a fan rotor of the above-specified type, characterized in that it includes at one end a nib having two faces for bearing against the blade root, which faces are formed by a first face that is radial for positioning the blade root, and by a second face that is oblique for retaining the blade root. These two faces are connected together via a transverse groove of section that has a concave rounded shape.

BRIEF DESCRIPTION OF THE SEVERAL VIEWS OF THE DRAWINGS

The invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
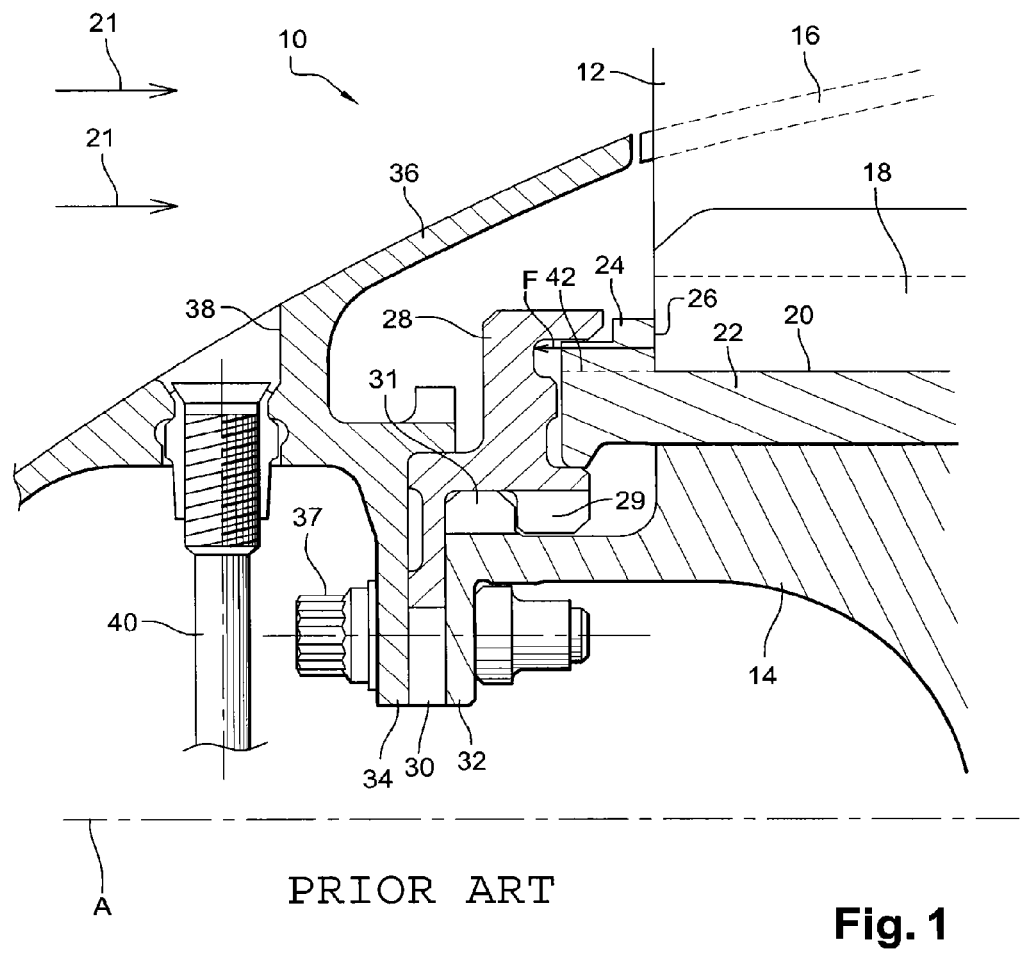
FIG. 1 is a fragmentary diagrammatic half-view in axial section of a turbomachine fan rotor of the prior art.

Reference is made initially to FIG. 1 which shows a turbomachine fan rotor 10 of the art prior to the present invention.

The fan rotor 10 comprises blades 12 carried by a disk 14 with interblade platforms 16 interposed therebetween, the disks 14 being fastened at an upstream end to a shaft (not shown) of the turbomachine.

Each fan blade 12 comprises an airfoil connected at its radially inner end to a root 18 that is engaged in a substantially axial groove 20 of complementary shape in the disk 14 that serves to hold the blade radially on the disk.

The interblade platforms 16 form a wall that defines the inside of the air-flow stream 21 entering the turbomachine, and they include means that co-operate with corresponding means provided on the disk 14 between the grooves 20 for fastening the platforms to the disk.

A spacer 22 is interposed between the root 18 of each blade and the bottom of the corresponding groove 20 in the disk in order to prevent the blade from moving radially in the groove. Each spacer 22 is formed by an elongate bar carrying a nib 24 at its upstream end, the nib extending radially outwards.

The nib 24 has a downstream radial face 26 that, in the assembled position as shown in FIG. 1, bears axially against a radial face of the upstream end of the blade root 18 to retain the blade axially on the disk 14 in the upstream direction and to define an accurate axial position for said blade relative to the disk.

An annular cheekplate 28 is fastened coaxially on the upstream end of the disk 14, with the outer periphery of the cheekplate 28 lying upstream from the nibs of the spacers 22 at a small axial distance therefrom. The cheekplate 28 is held on the disk 14 by dogs 29 that engage in dogs 31 of the disk, the cheekplate 28 also having at its inner periphery an annular flange 30 that is interposed between an upstream annular flange 32 of the disk 14 and an inner annular flange 34 of a spinner or cap 36 arranged upstream from the disk 14 and the blades 10. The flanges 30, 32, and 34 have axial orifices for passing bolts 37 or the like for clamping the flanges together.

The cap 36 is substantially frustoconical in shape, flaring downstream, with the wall defined by the interblade platforms 16 axially extending the cap. The cap 36 has radial holes 38 for mounting balanced weights 40.

In the event of a fan blade 12 being lost, that blade strikes an adjacent fan blade, which is then subjected to a very violent upstream axial force, which force is transmitted to the upstream cheekplate 28 by the spacer 22 associated with the blade. The root 18 of the blade subjected to this axial force begins by pressing axially against the face 26 of the nib 24 of the spacer (arrow F), the nib 24 then in turn comes to bear axially against the cheekplate 28, which deforms elastically so as to damp a fraction of the above-mentioned axial force. Retaining means for axially retaining the blades 12 on the disk are also mounted on the disk downstream.

When the above-mentioned axial force is being transmitted, the nib 24 of the spacer is subjected to large shear forces in a plane represented diagrammatically by dashed lines 42. To withstand these shear forces, the nib 24 is overdimensioned in the axial direction, thereby leading to drawbacks in terms of size and weight.

The invention serves to remedy those drawbacks by providing an oblique face on the nib against which the blade root comes to bear, this oblique face creating a wedging effect that increases friction forces and bearing forces between the blade root and the side walls of the groove in the disk, thereby serving to absorb a portion of the impact that results from loss or rupture of a fan blade.

Figure 2:
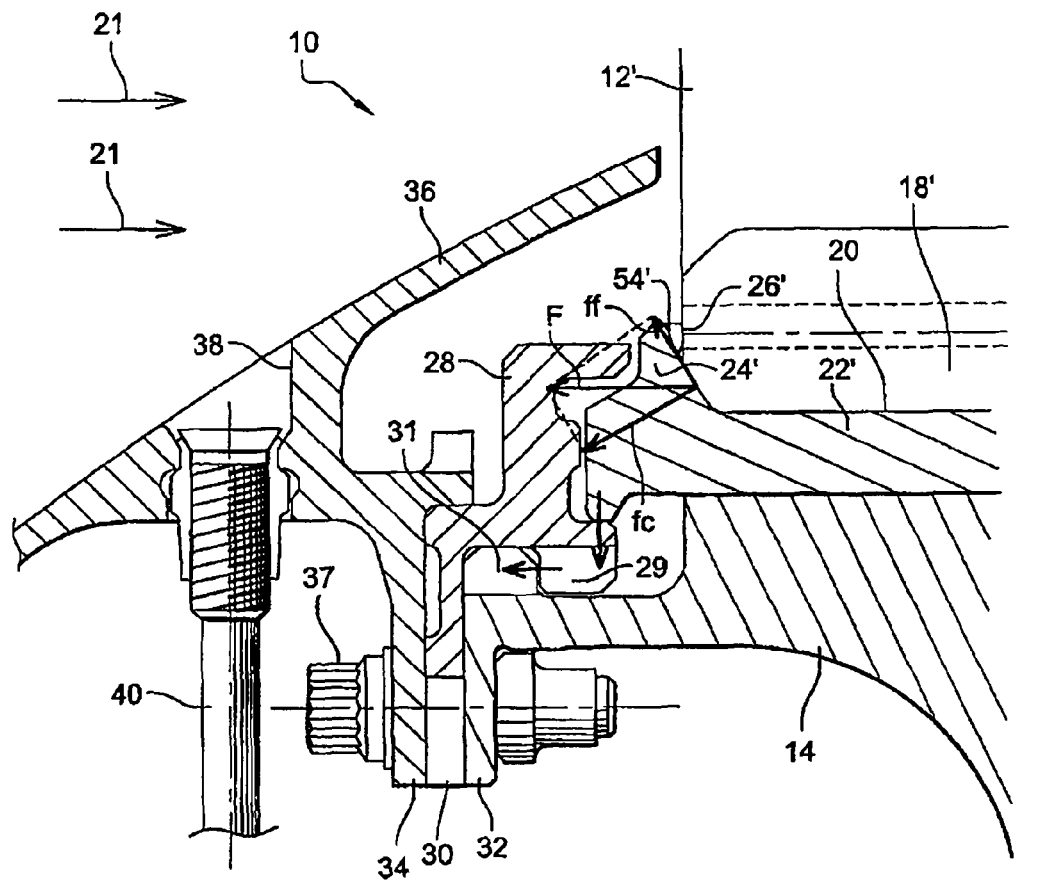
FIG. 2 is a fragmentary diagrammatic half-view in axial section of a turbomachine fan rotor of the present invention.
Figure 3:
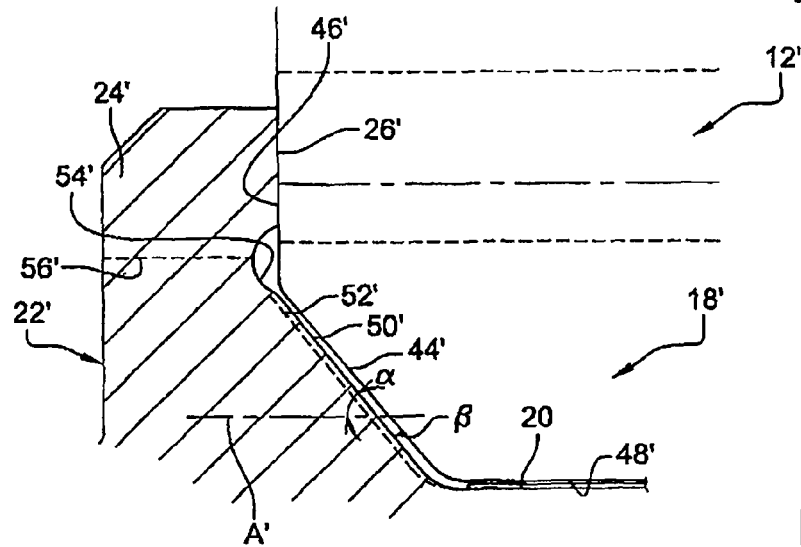
FIG. 3 is a view on a larger scale showing a portion of FIG. 2.

In the embodiment shown in FIGS. 2 and 3, the disk 14, the cheekplate 28, and the cap 36 are identical to those of FIG. 1.

The blade 12' differs from that of FIG. 1 in that its root 18 includes at its upstream end a face 44' for bearing against the nib 24' of the spacer 22', this face 44' extending obliquely relative to the axis A of the fan, as described in greater detail below. This oblique face 44' is formed at the radially inner end of the blade root and it connects the upstream radial face 46' of the root to its radially inner longitudinal face 48'.

The upstream radial face 46' of the blade root 18' in the assembled position and in the unstressed state as shown in the drawings bears axially against a downstream radial face 26' provided on a radially outer end portion of the nib 24', serving to position the blade root axially in accurate manner on the disk 14.

Radially inside the radial face 46', the nib 24' also includes a face 50' situated facing the face 44' of the blade root for the purpose of co-operating with said face 44' by bearing thereagainst in the event of a fan blade 12' being lost or broken. This face 50' extends obliquely relative to the longitudinal axis A of the fan and is substantially parallel to the oblique face 44' of the blade root.

The angle $\alpha$ formed between the oblique face 50' of the nib and the axis of the fan lies in the range 10° to 80°, and preferably in the range 20° to 70°. It is about 40° to 50° in the example shown.

In the unstressed state as shown in the drawings, the oblique faces 44' and 50' of the blade root and of the nib form between them an angle $\beta$ that is less than 10°, preferably lying in the range 2° to 5°, approximately. The faces 44' and 50' diverge from each other going downstream.

Teeth or grooves 52' or surface irregularities may be formed on the oblique face 50' of the nib, as explained below.

The oblique face 50' of the nib is connected to the radial face 26' of the nib via a transverse groove 54'. This transverse groove has a section of concave rounded shape in the example shown.

This groove 54' facilitates elastic deformation of the nib 24' in an upstream direction in the event of the blade root bearing axially against the radial face 26' of the nib, with the nib bending in the groove 54'. The groove 54' also forms means for weakening the nib 24' such that the radially outer portion of the nib may be broken off when the axial force transmitted by the spacer reaches a certain threshold. Dashed lines 56' represent diagrammatically the rupture plane of the radially outer portion of the nib 24'.

In the event of a fan blade being lost, the adjacent blade 12' is pushed axially upstream and applies a large axial force onto the radially outer end of the nib 24' that deforms elastically up to a certain threshold, thereby enabling the blade root 18' to come to bear via its oblique face 44' against the oblique face 50' of the nib until these two oblique faces 44' and 50' become mutually parallel, being pressed one against the other over their entire extent. A portion of the impact to which the blade 12 is subjected (arrow F) is absorbed by the thrust and friction of the blade root against the side walls of the groove 20 of the disk (arrow $f_f$). The remainder of the axial force is transmitted by the nib 24' of the spacer to the cheekplate 28, which in turn transmits it to the disk 14 via the dogs 29 and 31, the nib 24' being subjected to shear forces (arrow $f_c$) that are smaller than those in FIG. 1. The grooves 52' or the surface irregularities serve to absorb an additional portion of the impact energy by friction and flattening, while the oblique face 44' of the blade root is pressed against the oblique face 50' of the spacer.

The invention makes it possible for the nibs 24' of spacers to be lighter than in the prior art, since the shear forces to which they are subjected in the event of a blade being lost are much smaller than in the prior art. The invention also makes it possible to omit axial retaining means mounted downstream of the blades, and thus significantly reduce the weight of the fan.

The invention claimed is:

1. A turbomachine fan rotor having an axis of rotation and comprising:
   a disk carrying blades including roots that are engaged in substantially axial grooves in an outer periphery of the disk, each axial groove having a bottom;
   a retaining cheekplate secured to the disk; and
   spacers engaged between said bottom of the grooves in the disk and the blade roots, an upstream end of each spacer configured to bear against the retaining cheekplate, each spacer including a nib extending radially outwards relative to the axis of rotation and configured to retain an upstream end of the corresponding blade root,
   wherein the nib of each spacer includes a downstream abutment face against which the upstream end of the blade root directly bears in a stress state induced by a violent force exerted on at least one of the blades, the downstream abutment face being oblique relative to the axis of rotation of the rotor.

2. A rotor according to claim 1, wherein the downstream abutment face of the nib forms an angle lying in the range 10° to 80° approximately, relative to the axis of the rotor.

3. A rotor according to claim 2, wherein the downstream abutment face of the nib forms the angle lying the range 20° to 70° approximately, relative to the axis of the rotor.

4. A rotor according to claim 1, wherein each blade root includes an upstream face that extends obliquely relative to the axis of rotation of the rotor and which is situated facing the downstream abutment face of the nib.

5. A rotor according to claim 4, wherein, in an unstressed state, the facing oblique faces of the nib and of the blade root are inclined relative to each other by an angle of less than 10°, the angle tending to disappear by elastic deformation of the nib in event of a violent force being applied to the blade.

6. A rotor according to claim 5, wherein, in the unstressed state, the facing oblique faces of the nib and of the blade root are inclined relative to each other by the angle lying in the range 2° to 5° approximately.

7. A rotor according to claim 1, wherein the oblique face of the nib is smooth.

8. A turbomachine, an airplane turboprop, or turbojet, comprising a fan rotor according to claim 1.

9. A turbomachine fan rotor having an axis of rotation and comprising:
   a disk carrying blades including roots that are engaged in substantially axial grooves in an outer periphery of the disk, each axial groove having a bottom;
   a retaining cheekplate secured to the disk; and
   spacers interposed between said bottoms of the grooves in the disk and the blade roots, an upstream end of each spacer configured to bear against the retaining cheekplate, each spacer including a nib extending radially outwards relative to the axis of rotation and configured to retain an upstream end of the corresponding blade root,
   wherein the nib of each spacer includes a downstream abutment face against which the upstream end of the blade root bears in event of a violent force, the downstream abutment face being oblique relative to the axis of rotation of the rotor, and
   wherein the nib includes, at a radially outer end, a downstream radial face for axially positioning the upstream end of the blade root.

10. A rotor according to claim 9, wherein each blade root includes an upstream face that extends obliquely relative to the axis of rotation of the rotor and which is situated facing the downstream abutment face of the nib, and wherein, in an unstressed state, the facing oblique faces of the nib and of the blade root are kept spaced apart from each other by the blade root bearing against the downstream radial face of the nib.

11. A rotor according to claim 9, wherein the downstream radial face of the nib is connected to the oblique face of the nib via a transverse groove configured to facilitate elastic deformation of the radially outer portion of the nib in an upstream direction.

12. A rotor according to claim 11, wherein the groove has a section of concave rounded shape.

13. A turbomachine fan rotor having an axis of rotation and comprising:
   a disk carrying blades including roots that are engaged in substantially axial grooves in an outer periphery of the disk, each axial groove having a bottom;
   a retaining cheekplate secured to the disk; and
   spacers interposed between said bottom of the grooves in the disk and the blade roots, an upstream end of each spacer configured to bear against the retaining cheekplate, each spacer including a nib extending radially outwards relative to the axis of rotation and configured to retain an upstream end of the corresponding blade root,
   wherein the nib of each spacer includes a downstream abutment face against which the upstream end of the blade root bears in event of a violent force, the downstream abutment face being oblique relative to the axis of rotation of the rotor, and
   wherein grooves or teeth are formed on the oblique face of the nib.

14. A blade root spacer having an axis and extending around the axis, the spacer comprising at one end a nib including two faces for bearing against the blade root, which faces are respectively formed by a first face that is radial to the axis, for positioning the blade root, and by a second face that is oblique relative to the axis, for retaining the blade root.

15. A spacer according to claim 14, wherein the radial and oblique faces are connected to each other via a transverse groove having a section of concave rounded shape.

16. A turbomachine fan rotor having an axis of rotation and comprising:
   a disk carrying blades including roots having an upstream face and which are engaged in substantially axial grooves in an outer periphery of the disk, each groove having a bottom;
   a retaining cheekplate secured to the disk; and
   spacers interposed between said bottoms of the grooves in the disk and the blade roots, an upstream end of each spacer configured to bear against the retaining cheekplate, each spacer including a nib extending radially outwards relative to the axis of rotation and configured to retain the upstream end of the corresponding blade root,
   wherein the nib of each spacer includes a downstream abutment oblique relative to the axis of rotation of the rotor,
   wherein, in an unstressed situation, the respective upstream faces of the blade roots are spaced apart from the respective downstream abutment faces of the spacer nibs, and
   wherein, in a situation in which at least one of said blades is subjected to an upstream substantially axial force, the upstream face of the corresponding at least one blade root is pressed against the downstream abutment face of the corresponding spacer nib.

* * * * *

UNITED STATES PATENT AND TRADEMARK OFFICE
CERTIFICATE OF CORRECTION

PATENT NO.        : 8,740,568 B2                                          Page 1 of 1
APPLICATION NO.   : 12/995063
DATED             : June 3, 2014
INVENTOR(S)       : Xavier Louis Barthelemy Millier et al.

It is certified that error appears in the above-identified patent and that said Letters Patent is hereby corrected as shown below:

In the Claims

Column 6, line 24, claim 3, change "lying the range" to --lying in the range--.

Signed and Sealed this
Eighteenth Day of November, 2014

Michelle K. Lee
*Deputy Director of the United States Patent and Trademark Office*